(12) United States Patent
Ukita et al.

(10) Patent No.: US 10,589,710 B2
(45) Date of Patent: Mar. 17, 2020

(54) GAS GENERATOR

(71) Applicant: DAICEL CORPORATION, Osaka-shi, Osaka (JP)

(72) Inventors: Shinichiro Ukita, Tatsuno (JP); Katsuhiro Imoto, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 16/064,315

(22) PCT Filed: Jan. 24, 2017

(86) PCT No.: PCT/JP2017/002253
§ 371 (c)(1),
(2) Date: Jun. 20, 2018

(87) PCT Pub. No.: WO2017/130935
PCT Pub. Date: Aug. 3, 2017

(65) Prior Publication Data
US 2019/0001918 A1    Jan. 3, 2019

(30) Foreign Application Priority Data
Jan. 25, 2016   (JP) .................................. 2016-011367

(51) Int. Cl.
*B60R 21/272*   (2006.01)
*B60R 21/274*   (2011.01)
(Continued)

(52) U.S. Cl.
CPC ........ *B60R 21/272* (2013.01); *B60R 21/2171* (2013.01); *B60R 21/274* (2013.01);
(Continued)

(58) Field of Classification Search
CPC . B60R 21/2171; B60R 21/272; B60R 21/274; B60R 2021/26029; B60R 2021/2725
(Continued)

(56) References Cited

U.S. PATENT DOCUMENTS 7,600,781 B2 * 10/2009  Yamashita ............ B60R 21/261
                                                                280/736
2005/0200107 A1   9/2005  Matsuda et al.
2014/0090572 A1 *  4/2014  Nakashima ........... B60R 21/264
                                                                102/363

FOREIGN PATENT DOCUMENTS

EP    1 286 856 B1   3/2013
JP    2003-520153 A   7/2003
(Continued)

*Primary Examiner* — Stephen Johnson
*Assistant Examiner* — Benjamin S Gomberg
(74) *Attorney, Agent, or Firm* — Birch, Stewart, Kolasch & Birch, LLP

(57) ABSTRACT

A gas generator includes: an ignition device chamber arranged at one end opening of a housing; a diffuser portion provided with a gas discharge port and arranged at another end opening; a pressurized gas chamber arranged between the ignition device chamber and the diffuser portion; a first rupturable plate closing the one end opening between the ignition device chamber and the chamber; a second rupturable plate closing the other end opening between the chamber and the diffuser portion; an igniter and a molded article of a gas generating agent accommodated in the ignition device chamber; a gas charged in the chamber; and an amount A (J/msec) of energy generated per unit time by the gas generating agent, a cross-sectional area B ($cm^2$) of the chamber at a portion proximate to the ignition device chamber, and a density C ($g/cm^3$) of the gas satisfy A/B× C=320 to 490.

4 Claims, 3 Drawing Sheets

(51) Int. Cl.
*B60R 21/217* (2011.01)
*B60R 21/26* (2011.01)

(52) U.S. Cl.
CPC ............... *B60R 2021/26029* (2013.01); *B60R 2021/2725* (2013.01)

(58) Field of Classification Search
USPC ........................................................ 102/530
See application file for complete search history.

(56) References Cited

FOREIGN PATENT DOCUMENTS

| | | |
|---|---|---|
| JP | 2005-199867 A | 7/2005 |
| JP | 2014-69628 A | 4/2014 |
| WO | WO 01/42047 A2 | 6/2001 |

\* cited by examiner

[Fig. 1]
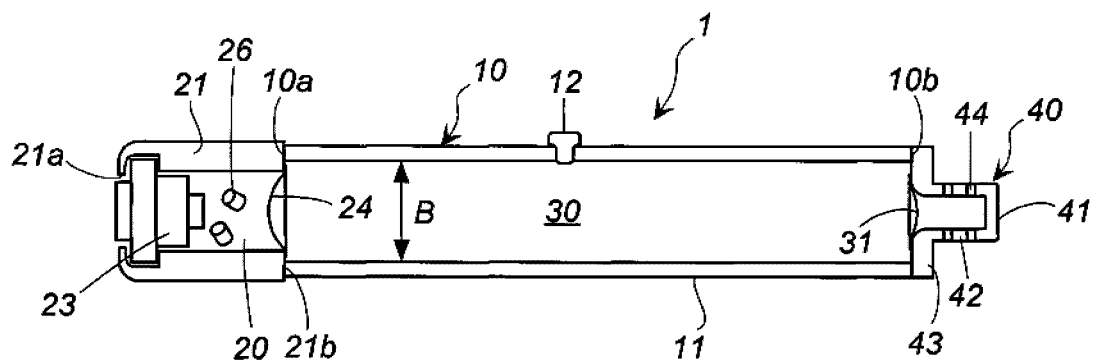
[Fig. 2]
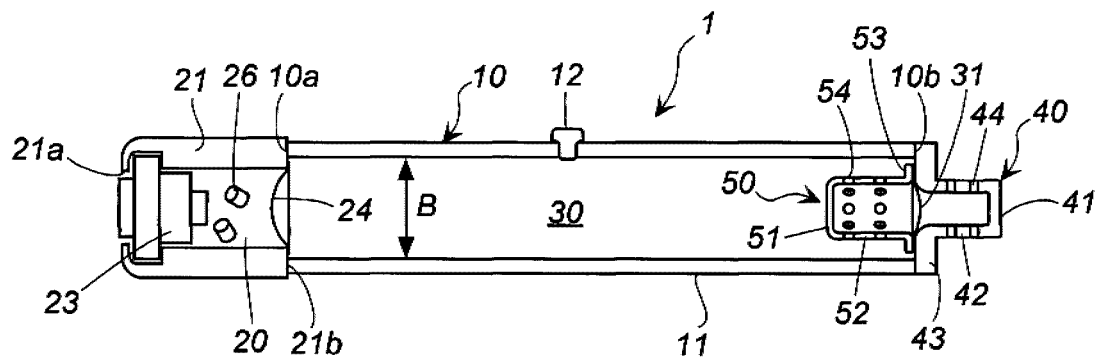

[Fig. 3]
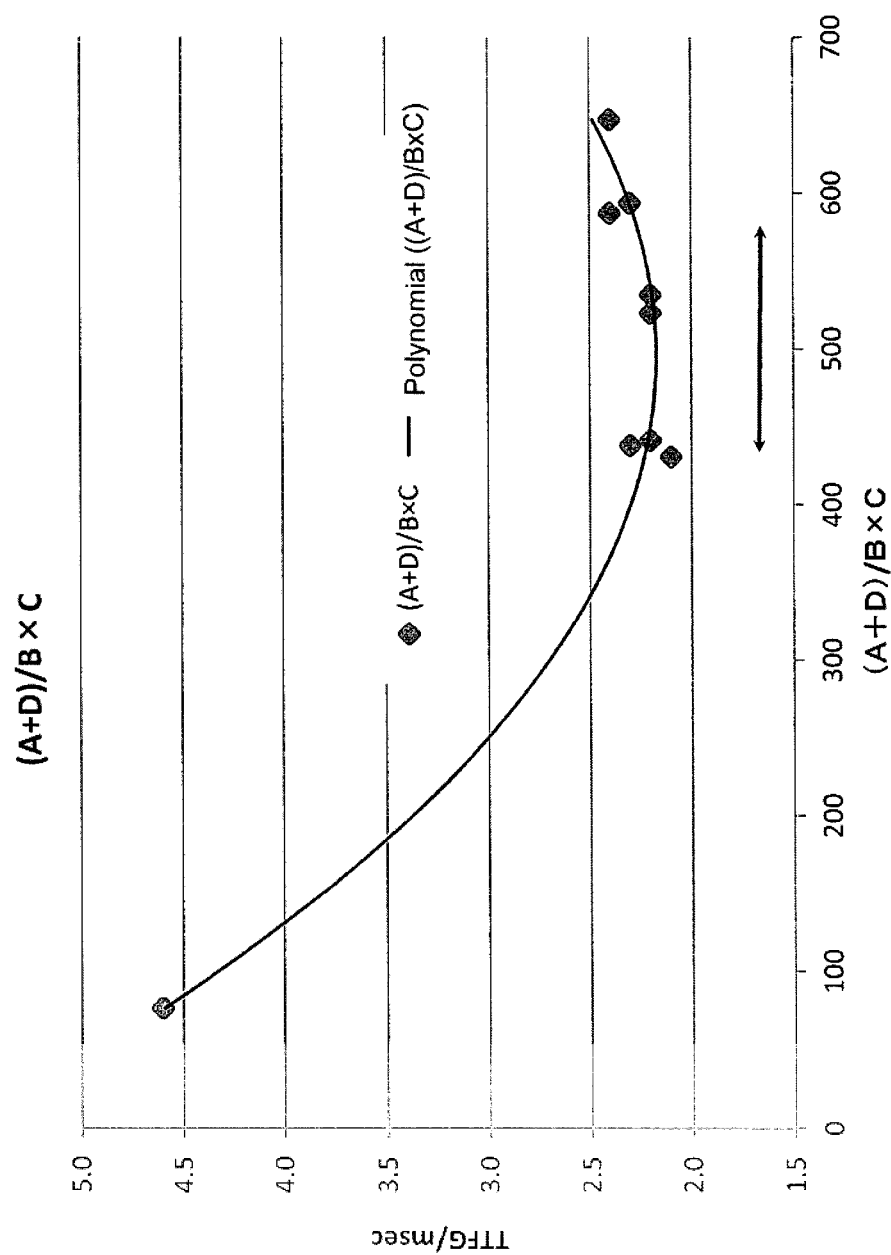

[Fig. 4]
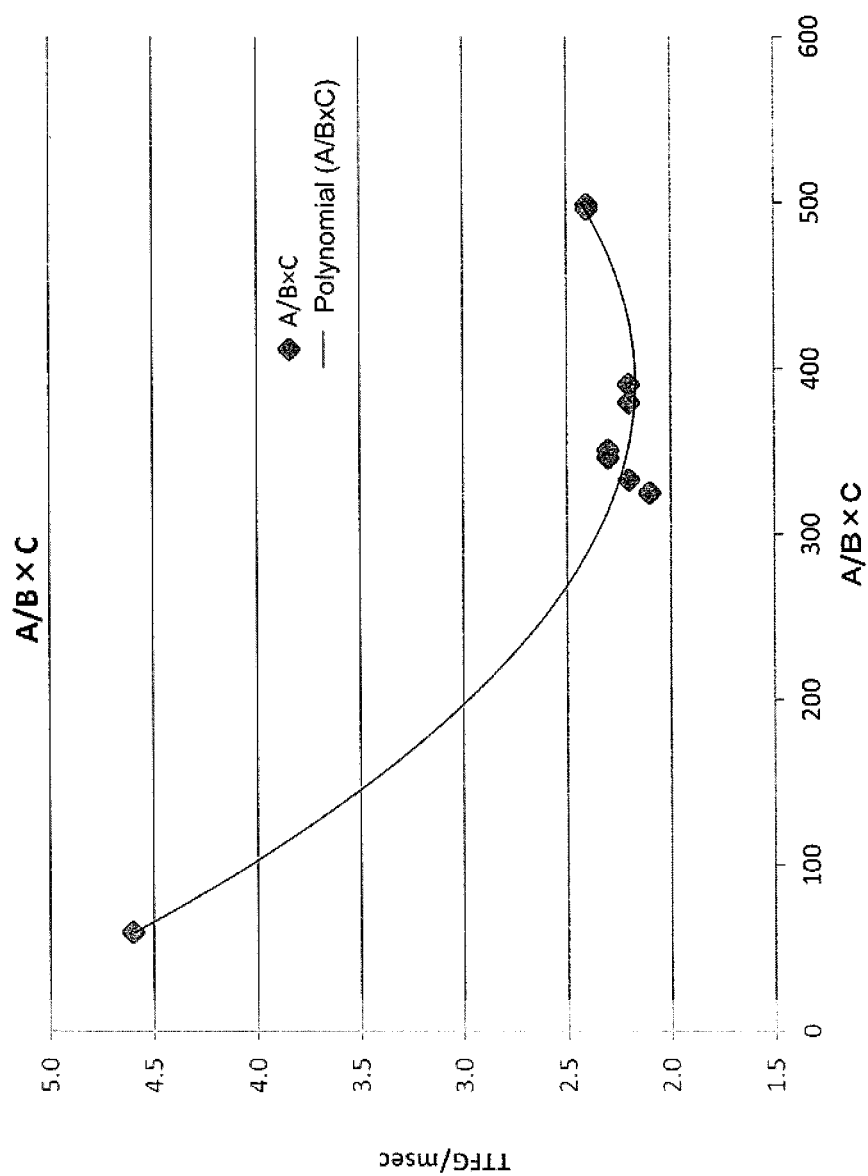

GAS GENERATOR

TECHNICAL FIELD

The present invention relates to a gas generator which is useable in an airbag apparatus mounted in an automobile or the like.

DESCRIPTION OF RELATED ART

Gas generators used for airbag apparatus include a gas generator in which only a gas generating agent is used as a gas source and a gas generator in which argon, helium, or the like is charged as a gas source under a high pressure.

In the gas generator in which argon, helium, or the like is charged under a high pressure, a rupturable plate closes a gas discharge path between a pressurized gas chamber in which a gas is charged under a high pressure and a gas discharge port inside the pressurized gas chamber, before actuation. During actuation, the rupturable plate is ruptured and the gas discharge path is opened to discharge the gas.

JP-A No. 2014-69628 discloses an invention of a hybrid type inflator including a pressurized gas and a gas generating agent.

As shown in FIG. 1, an inflator 1 has a squib-side cap part 9 closed with a bursting plate 14 at one end of a housing 3 and an ejection-side cap part 7 closed with a bursting plate 13 at the opposite end portion thereof. The inflator 1 has a middle portion charged with a pressurized gas G0.

It is described that, in the inflator of JP-A No. 2014-69628, the gas generating agent 11 makes it possible to use combustion gas generated at the time of the combustion, together with the pressurized gas G0 for the expansion of an air bag, and specifically, there is used the gas generating agent in which the calorific value at the time of the combustion is set within a range of 6,000 to 10,000 J/g (paragraph number 0014).

Further, in JP-A No. 2014-69628, it is also described that "in the inflator 1 of this embodiment, the inside thereof is charged with the pressurized gas G0 and the gas generating agent 11 in such a manner that the molar ratio (pressurized gas/combustion gas) of the pressurized gas to the combustion gas generated by the combustion of the gas generating agent 11 is within a range of 80 to 130" (paragraph number 0016).

It is also described that, in the inflator 1 of the embodiment, "the squib 10 is actuated to combust the gas generating agent 11, thereby generating the combustion gas. When the internal pressure of the squib-side cap part 9 is increased by the combustion gas generated, the bursting plate 14 bursts to allow the combustion gas to enter the housing 3. Then, when the pressurized gas G0 in the housing 3 is heated by this combustion gas to increase the internal pressure of the housing 3, the bursting plate 13 bursts to allow the pressurized gas G0 and the combustion gas to flow out as an expansion gas G from the gas ejection openings 7b provided in the ejection-side cap part 7 to the outside of the inflator 1, thereby expanding the air bag of the air bag device" (paragraph number 0017).

That is, as a result of an increase in the pressure of a portion corresponding to the pressurized gas G0, the bursting plate 13 ruptures to allow the gas to be discharged from the gas discharge ports 7b through the ejection-side cap part 7.

An inflator 20 disclosed in JP-A No. 2003-520153 includes an inflator housing 24 filled with a storage gas (such as argon or helium) and an initiator assembly 40 provided at a first end portion 28 of the inflator housing 24, and a second end portion 32 opposite to the first end portion 28 is closed with a burst disc 60. The break mechanism of the burst disk 60 is described as follows:

"when the initiator charge is ignited, it produces a shock wave that moves from the first end of the inflator housing and through the unobstructed inflator housing having the stored gas to the burst disc and the second end of the inflator housing . . . . After the shock wave reaches the burst disc, it is reflected therefrom. Upon reflection from the burst disc, a pressure is created between the burst disc and the shock wave. This created pressure is greater than the burst pressure of the burst disc thereby opening or rupturing it. After opening, the inflation gases in the inflator housing due to the stored gas and the gas generated by the activation of the initiator charge and/or other propellant escape through the opened burst disc." (paragraph number 0011).

In the invention of JP-A No. 2003-520153, unlike in the invention of JP-A No. 2014-69628, a combustion gas from a gas generating agent is not used for rupturing the burst disc located on the side of the gas discharge ports.

SUMMARY OF INVENTION

A first embodiment of the present invention provides a gas generator, including:

an ignition device chamber arranged at a first end opening of a cylindrical housing;

a diffuser portion provided with a gas discharge port and arranged at a second end opening opposite to the first end opening in a longitudinal axial direction of the cylindrical housing;

a pressurized gas chamber arranged between the ignition device chamber and the diffuser portion;

a first rupturable plate closing the first end opening between the ignition device chamber and the pressurized gas chamber;

a second rupturable plate closing the second end opening between the pressurized gas chamber and the diffuser portion;

an igniter and a molded article of a gas generating agent being accommodated in the ignition device chamber;

a gas which serves as a gas source being charged in the pressurized gas chamber; and an amount A (J/msec) of energy generated per unit time from the molded article of the gas generating agent charged in the ignition device chamber, a cross-sectional area B (cm$^2$), orthogonal to the longitudinal axial direction of the cylindrical housing, of the pressurized gas chamber at a portion proximate to the ignition device chamber, and a density C (g/cm$^3$) of the gas charged in the pressurized gas chamber satisfying an energy control factor represented by the following equation (I):

$$A/B \times C = 320 \text{ to } 490 \qquad (I).$$

Further, a second embodiment of the present invention provides a gas generator, including:

an ignition device chamber arranged at a first end opening of a cylindrical housing;

a diffuser portion provided with a gas discharge port and arranged at a second end opening opposite to the first end opening in a longitudinal axial direction of the cylindrical housing;

a pressurized gas chamber arranged between the ignition device chamber and the diffuser portion;

a first rupturable plate closing the first end opening between the ignition device chamber and the pressurized gas chamber;

a second rupturable plate closing the second end opening between the pressurized gas chamber and the diffuser portion;

an igniter which includes an ignition agent, and a molded article of a gas generating agent being accommodated in the ignition device chamber;

a gas which serves as a gas source being charged in the pressurized gas chamber; and an amount A (J/msec) of energy generated per unit time from the molded article of the gas generating agent charged in the ignition device chamber, an amount D (J/msec) of energy generated per unit time from the igniter, a cross-sectional area B (cm$^2$), orthogonal to the longitudinal axial direction of the cylindrical housing, of the pressurized gas chamber at a portion proximate to the ignition device chamber, and a density C (g/cm$^3$) of the gas charged in the pressurized gas chamber satisfying an energy control factor represented by the following equation (II):

$$(A+D)/B \times C = 430 \text{ to } 580 \qquad (II).$$

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows a cross-sectional view of a gas generator of the present invention in a longitudinal axial direction;

FIG. 2 shows a cross-sectional view of a gas generator in another embodiment other than that in FIG. 1 in a longitudinal axial direction;

FIG. 3 shows a graph showing a relationship between an energy control factor of an equation (II) and TTFG; and FIG. 4 shows a graph showing a relationship between the energy control factor of an equation (I) and TTFG.

DETAILED DESCRIPTION OF INVENTION

The present invention provides a gas generator which allows a rupturable plate closing a gas discharge path to be ruptured with a less energy.

In the gas generator in the first embodiment of the present invention, when an igniter in an ignition device chamber is actuated to ignite and burn a molded article of a gas generating agent, an internal pressure of the ignition device chamber increases to rupture the first rupturable plate. As the molded article of the gas generating agent, a known molded article of a gas generating agent may be used. For example, a gas generating agent disclosed in JP-A No. 2005-199867 can be used and, in particular, a gas generating agent having a composition including nitroguanidine and strontium nitrate can be used.

Energy released from an opening produced by the rupture of the first rupturable plate moves inside the pressurized gas chamber to collide with and rupture the second rupturable plate, and opens a gas discharge opening from the pressurized gas chamber to the diffuser portion.

After passing through the opening in the second rupturable plate, the gas is discharged from a gas discharge port of the diffuser portion.

In the gas generator of the present invention, the second rupturable plate is ruptured not because the combustion gas of the gas generating agent increases an entire pressure inside the pressurized gas chamber, but because a pressure wave, which is generated by energy generated from the gas generating agent at a timing earlier than the entire pressure increase within the pressurized gas chamber, propagates through the pressurized gas to rupture the second rupturable plate.

Therefore, the gas is swiftly discharged from the gas generator. Conceivably, the pressure wave results from a large difference between the energy produced in the ignition device chamber and the energy produced in the pressurized gas chamber when the energy generated in the ignition device chamber flows into the pressurized gas chamber. Accordingly, it is necessary to generate, in a short time, a certain amount of the energy from the gas generating agent and to create a pressure difference between the pressurized gas chamber and the ignition device chamber. Note that the pressure wave mentioned herein indicates a wave which propagates at a speed not more than a sound speed.

The gas generator of the present invention which operates as mentioned above is a hybrid type gas generator in which a molded article of a gas generating agent and a pressurized gas are used. In the present invention, by satisfying an energy control factor of the equation (I), the following performances (a), (b), and (c) are realized:

(a) restricting an amount of energy generated from the ignition device chamber for rupturing the second rupturable plate closing between the pressurized gas chamber and the diffuser portion;

(b) allowing the energy generated in the ignition device chamber to reach and rupture the second rupturable plate while minimizing as possible an attenuation of the energy at the time of passing through pressurized gas chamber; and (c) restricting a mass of the gas generator by maintaining an amount of the generated energy and a charging density of the pressurized gas in proper ranges.

In the equation (I), A (J/msec) represents energy generated per unit time from the molded article of the gas generating agent, which is determined by the following method.

(1) A molded article of a gas generating agent to be charged into the gas generator which is molded into a prescribed shape is prepared. A known composition, a known composition ratio, known shape and size can be employed for the molded article of the gas generating agent to be used.

When the gas generator is charged with the molded article of the gas generating agent and actuated, a period of time (T/msec) until the pressure in the ignition device chamber where the molded article of the gas generating agent is arranged reaches a maximum value and a maximum pressure value (P/kPa) are measured. T herein indicates a point of the time when the closing member (the first rupturable plate) is ruptured.

(2) Next, a burning rate r of the molded article of the gas generating agent arranged in the housing is obtained. The burning rate is obtained by a time required for the combustion to be completed and a combustion distance (a length of a strand) when the strand is placed in a nitrogen atmosphere under a predetermined pressure, ignited from one end surface thereof using a nichrome wire, and burnt such that the combustion thereof proceeds to the opposite end surface. In this case, the strand is obtained by molding a molded article with the same density and composition ratio as those of the molded article of the gas generating agent into a predetermined size (a length of 12.7 mm).

The measurement is conducted under a plurality of different pressures, and a pressure index n for the molded article of the gas generating agent is obtained ($r=a \times P^n$ where a is a constant).

(3) P1/2 (kPa), at a point equivalent to a half value (T1/2) of T obtained in the above (1), is obtained.

(4) The burning rate r under the pressure P1/2 obtained in the above (3) is obtained by the equation in the above (2).

(5) A mass (g) of the molded article of the gas generating agent in the above (1), which is burned at the burning rate obtained in the above (4) during a period of time until an internal pressure in the housing reaches a maximum value, is obtained.

(6) Energy generated from the entire molded article of the gas generating agent to be charged in the gas generator is measured using a predetermined device and divided by a charging amount of the charged molded article of the gas generating agent, thereby obtaining a generated energy (J/g) per unit weight.

(7) The values obtained in the above (5) and (6) are multiplied by each other to obtain a total amount of the energy (J/mol).

Since A (J/msec) represents energy generated per unit time from the molded article of the gas generating agent, it indicates that, as A (J/msec) is larger, a higher energy is generated at once in a short period of time. As the molded article of the gas generating agent, a large number of molded articles in a foam of granule or pellet are arranged, and an overall surface area (i.e., ignition area) is increased. Accordingly, as the ignition area is larger, a high-density energy is generated to be delivered as a pressure wave to the second rupturable plate.

In the equation (I), B represents a cross-sectional area ($cm^2$) of a cross section, orthogonal to a longitudinal axial direction of the cylindrical housing, of the pressurized gas chamber at a portion proximate to the ignition device chamber.

When the cylindrical housing has a uniform diameter (a uniform inner diameter), B in the equation (I) represents a cross-sectional area at an optional position in a length direction.

Since the cross-sectional area of the cylindrical housing is factor for dispersing the energy from the molded article of the gas generating agent, when the inner diameter of the cylindrical housing is not uniform, B in the equation (I) is assumed to be a cross-sectional area of the cylindrical housing in the portion with the maximum inner diameter (i.e., the portion having the maximum cross-sectional area).

In the equation (I), A/B represents a size of a space determined by a cross-sectional area thereof inside the pressurized gas chamber into which the energy generated from the molded article of the gas generating agent is discharged. As the cross-sectional area B is larger, the energy is dispersed in a wider range. However, when the cross-sectional area B is excessively small, a charging amount of the gas becomes insufficient to fully inflate an air bag.

Accordingly, A/B represents an amount of the energy per unit cross-sectional area (a measure of the amount work performed by the generated energy on the pressurized gas).

In the equation (I), C represents a density ($g/cm^3$) of the gas charged in the pressurized gas chamber.

The density C is factor for transmitting the energy (the pressure wave) generated in the pressurized gas chamber to the second rupturable plate, while minimizing the attenuation of the energy (the pressure wave).

As the charging density of the pressurized gas in the pressurized gas chamber is higher, the attenuation of the energy (the pressure wave) is reduced, and as the charging density of the pressurized gas is lower, the attenuation is increased. In other words, in order to efficiently deliver the energy to the second rupturable plate, it is desirable to suppress consumption of the energy as much as possible while the energy is transmitted to the second rupturable plate. Note that, even when a charging pressure is the same, the density varies depending on a type of the gas.

Since the gas (the combustion gas) generated by the combustion of the molded article of the gas generating agent also flows into the pressurized gas chamber, it is conceivable that the increased molar number due to the combustion gas contributes to the generated energy (the pressure wave).

Accordingly, when the increased molar number due to the combustion gas is taken into account, C in the equation (I) can also be obtained by $C \times (E+F)/E$ (E represents the molar number of the pressurized gas, and F represents the molar number of the gas (the combustion gas) generated by the molded article of the gas generating agent).

A energy control factor obtained by the equation (I): A/B×C is 320 to 490.

When the energy control factor (a lower limit value) by the equation (I) is less than 320, A (J/msec) decreases, B increases, or the gas density C decreases.

When A (J/msec) decreases, B increases, or C decreases, the generated energy (the pressure wave) decreases or the propagation force of the pressure wave decreases, and as a result, it becomes difficult to rupture the second rupturable plate.

When the energy control factor (an upper limit value) by the equation (I) exceeds 490, A (J/msec) increases, B decreases, or the gas density C increases.

In this case, the energy generated upon actuation becomes extremely high. Accordingly, it is necessary to take measures such as increasing a thickness of the cylindrical housing to enhance resistance to the generated energy. This undesirably increases a mass of the gas generator.

When the equation (I) is an equation (I')=A/B×C×(E+F)/E, the energy control factor is preferably in the range of 320 to 510.

The gas generator in the second embodiment of the present invention is the same as the gas generator in the first embodiment, and the description given above regarding the first embodiment directly applies thereto. However, the gas generator in the second embodiment is different from the gas generator in the first embodiment in that energy from an igniter (an ignition agent) is added to the energy from the combustion gas generated from the molded article of the gas generating agent. Each of the molded article of the gas generating agent and the ignition agent serves as the generation source of the pressure wave. As the ignition agent, a known ignition agent including a mixture of zirconium and potassium perchlorate (ZPP) can be used. Alternatively, as the ignition agent, an ignition agent including a mixture of titanium hydride and potassium perchlorate (THPP), or the like can be used. When an igniter including such an ignition agent is used, an ignition agent weighing 350 mg or less can be used as the ignition agent. More preferably, an igniter including 300 mg or less of such an ignition agent is used.

The energy control factor obtained by the equation (II): (A+D)/B×C is 430 to 580.

When the energy control factor (a lower limit value) by the equation (II) is less than 430, A+D (J/msec) decreases, B increases, or the gas density C decreases.

When A+D (J/msec) decreases, B increases, or the gas density C decreases, the generated energy (the pressure wave) decreases or the propagation force of the pressure wave decreases, and as a result, it becomes difficult to rupture the second rupturable plate.

When the energy control factor (an upper limit value) by the equation II exceeds 580, A+D (J/msec) increases, B decreases, or the gas density C increases.

In this case, the energy generated upon actuation is extremely high. Accordingly, it is necessary to take measures such as increasing a thickness of the cylindrical housing to enhance resistance to the generated energy. This undesirably increases a mass of the gas generator.

Even when the ignition agent is burned, a gas component is scarcely generated so that the molar number of the gases in (E+F)/E is scarcely affected. Accordingly, in an equation (II')=(A+D)/B×C×(E+F)/E based on the equation (I'), it is sufficient to consider only an influence of D. The range of (A+D)/B×C×(E+F)/E is preferably 430 to 600.

In a more preferable embodiment of the gas generator of the present invention, the first rupturable plate or the second rupturable plate is covered with a cup-shaped filter from the pressurized gas chamber, the cup-shaped filter has a bottom, a circumferential wall and an opening, at least the circumferential wall is provided with a plurality of gas passage holes passing therethrough in a thickness direction, and the opening of the cup-shaped filter is fixed to the diffuser portion such that the bottom thereof faces the first rupturable plate or the second rupturable plate.

With the use of the cup-shaped filter, even though broken pieces are produced upon rupture of the first rupturable plate, it is possible to prevent the broken pieces from being discharged through the gas discharge port.

Note that, the rupturing of the second rupturable plate by the pressure wave is not inhibited even when the cup-shaped filter is disposed on the side of the first rupturable plate or on the side of the second rupturable plate. For example, the inner diameter of the cylindrical housing can be reduced gradually at the second end opening to allow the pressure wave to be reflected and more likely to be converged to the gas passage holes of the cup-shaped filter.

Since the gas generator of the present invention satisfies the energy control factor of the equation (I) or the equation (II), it is possible to reliably rupture the second rupturable plate with a less amount of energy, while suppressing an energy loss. Further, it is also possible to reduce a mass of the gas generator and ensure safety of actuation.

The gas generator of the present invention is used as a gas generator for an airbag apparatus mounted in an automobile, and also for all applications in which a gas needs to be instantaneously supplied.

Preferable Embodiments of Invention (1) Gas Generator Shown in FIG. 1

A gas generator 1 has an ignition device chamber 20 arranged at a first end opening 10a of a cylindrical housing 10 and has a diffuser portion 40 at a second end opening 10b which is opposite to the first end opening 10a in a longitudinal axial direction.

The cylindrical housing 10, the ignition device chamber 20 and the diffuser portion 40 are all made of a metal such as iron or stainless steel. The respective connected portions thereof are welded together.

A pressurized gas chamber 30 is arranged between the ignition device chamber 20 and the diffuser portion 40.

In the ignition device chamber 20, an electric igniter 23 is fixed at a first end opening 21a of a cylindrical ignition device chamber housing 21, and a second end opening 21b thereof is closed by a first rupturable plate 24 made of iron, stainless steel or the like.

A circumferential edge of the first rupturable plate 24 is fixed by welding to the second end opening 21b of the cylindrical ignition device chamber housing 21.

A known molded article of a gas generating agent 26 is charged inside the ignition device chamber 20.

In the gas generator 1, an inner diameter (d1: in FIG. 1, represented as an inner diameter of a communication hole connecting the pressurized gas chamber and the ignition device chamber) of the first end opening 10a in the state of not being closed by the first rupturable plate 24, an inner diameter (D1) of the cylindrical housing 10, and a maximum size (L1) of the molded article of the gas generating agent 26 charged in the ignition device chamber 20 satisfy a relationship of D1>d1>L1 and a relationship of d1/L1=2 to 17.

The cylindrical housing 10 shown in FIG. 1 has a uniform diameter (a uniform outer diameter and a uniform inner diameter) from the first end opening 10a to the second end opening 10b.

A cross-sectional area B (cm$^2$) of a cross section of the pressurized gas chamber 30 at a portion proximate to the ignition device chamber 20 orthogonal to a longitudinal axial direction of the cylindrical housing 10 can be set as shown in Table 1.

TABLE 1

| Outer diameter mm | Inner diameter mm | Cross-sectional area mm$^2$ | Cross-Sectional area B cm$^2$ |
|---|---|---|---|
| 15 | 13.0 | 132.7 | 1.3 |
| 20 | 16.8 | 221.7 | 2.2 |
| 25 | 21.2 | 353.0 | 3.5 |
| 30 | 25.0 | 490.9 | 4.9 |
| 35 | 31.0 | 754.8 | 7.5 |
| 40 | 35.0 | 962.1 | 9.6 |
| 45 | 39.0 | 1194.6 | 11.9 |

The second end opening 10b between the pressurized gas chamber 30 and the diffuser portion 40 is closed by a second rupturable plate 31 made of iron, stainless steel, or the like.

A gas such as argon or helium is charged into the pressurized gas chamber 30 under a high pressure. The pressurized gas can be sealed therein by that the pressurized gas is charged from a gap between a pin 12 and a hole in a circumferential wall 11 of the cylindrical housing 10 with the pin 12 inserted in the hole and the circumferential wall 11 and the pin 12 are welded together.

A density C (g/cm$^3$) of the gas charged in the pressurized gas chamber 30 can be set as shown in Table 2.

TABLE 2

| | Number of Moles (E) mol | Charging pressure MPa | Gas Ar ratio % | He ratio % | Average molecular weight g/mol | Molar volume ml/mol | Volume cm³ | Mass g | Density (C) g/cm³ |
|---|---|---|---|---|---|---|---|---|---|
| Comparative Example 1 | 0.30 | 42.0 | 96.0 | 4.0 | 38.5 | 61.8 | 18.5 | 11.6 | 0.6 |
| Comparative Example 2 | 0.51 | 42.0 | 96.0 | 4.0 | 38.5 | 61.8 | 31.5 | 19.6 | 0.6 |
| Comparative Example 3 | 1.75 | 42.0 | 0.0 | 100.0 | 40.0 | 54.5 | 95.3 | 7.0 | 0.1 |
| Example 1 | 2.9 | 60.0 | 40.0 | 60.0 | 18.4 | 53.8 | 156.1 | 53.3 | 0.34 |
| Example 2 | 1.3 | 21.0 | 96.0 | 4.0 | 38.5 | 110.1 | 142.1 | 49.7 | 0.35 |
| Example 3 | 1.7 | 40.0 | 70.0 | 30.0 | 29.2 | 68.2 | 118.1 | 50.5 | 0.43 |
| Example 4 | 1.8 | 50.0 | 70.0 | 30.0 | 29.2 | 58.2 | 104.8 | 52.5 | 0.50 |
| Example 5 | 1.6 | 40.0 | 70.0 | 30.0 | 29.2 | 68.2 | 109.1 | 46.7 | 0.43 |

The diffuser portion 40 includes a bottom surface 41, a circumferential surface 42, a flange 43 provided at an opening, and a plurality of gas discharge ports 44 formed in the circumferential surface.

The flange 43 and the second end opening 10b of the cylindrical housing 10 are welded together.

The second rupturable plate 31 is welded to a surface of the flange 43, which is on the side of the pressurized gas chamber 30.

Next, an operation of the gas generator 1 shown in FIG. 1 will be described.

The igniter 23 in the ignition device chamber 20 is actuated, and the molded article of the gas generating agent 26 is ignited and burnt to generate a combustion gas.

The first rupturable plate 24 is ruptured by a pressure increase in the ignition device chamber 20 due to the generation of the combustion gas, and the ignition device chamber 20 and the pressurized gas chamber 30 are communicated with each other.

When energies (energy from the gas generating agent and energy from an ignition agent) in the ignition device chamber 20 are released from the communication hole into the pressurized gas chamber 30, a pressure wave advances toward the second rupturable plate 31 due to a pressure difference between the ignition device chamber 20 and the pressurized gas chamber 30.

It is conceivable that this pressure wave advances as a longitudinal wave forming energy sparse/dense portions inside the pressurized gas chamber 30. Conceivably, the energy is increased at the time when the energy dense portion collides with the second rupturable plate 31.

That is, even though an amount of the energy in the dense portion before colliding with the second rupturable plate 31 is not large enough to rupture the second rupturable plate 31, it is conceivable that part of the wave energy reflected by the second rupturable plate is added to the energy dense portion, the whole energy becomes larger than a rupturing pressure of the second rupturable plate 31, and thereby, the second rupturable plate 31 is ruptured easily. This phenomenon occurs earlier than an increase in pressure of the entire pressurized gas chamber due to the combustion gas from the molded article of the gas generating agent 26.

Generally, in the case of causing the rupturing in this manner, an amount of the molded article of the gas generating agent 26 and an amount of the igniting agent are simply increased to increase energy (the pressure wave) A. This results in a generation of excessive energies from whole of the gas generating agent 26 and the igniting agent and therefore, a step such as to improve a pressure resistance capacity has to be taken.

In the gas generator 1 of the present invention, the energy control factor in the equation (I): A/B×C=320 to 490 and the energy control factor in the equation (II): (A+D)/B×C=430 to 580 are satisfied. Accordingly, even though A is not excessively increased (in other words, as long as a certain amount of energy is instantaneously generated), the second rupturable plate 31 is ruptured by adjusting B and C.

In the gas generator 1, the inner diameter (d1) of the first end opening 10a in the state of not being closed by the first rupturable plate 24, the inner diameter (D1) of the cylindrical housing 10, and the maximum size (L1) of the molded article of the gas generating agent 26 charged in the ignition device chamber 20 satisfy the relationship of D1>d1>L1 and the relationship of d1/L1=2 to 17.

The maximum size L1 mentioned herein is a length when the molded article of the gas generating agent 26 is in a columnar shape, and is a diameter when the molded article of the gas generating agent 26 is in a disk shape.

(2) Gas Generator in FIG. 2.

A gas generator 1 in FIG. 2 is different from the gas generator 1 in FIG. 1 only in that a cup-shaped filter 50 is disposed therein.

The cup-shaped filter 50 has a bottom 51, a circumferential wall 52 and a flange 53 formed at an opening. The circumferential wall 52 has a plurality of gas passage holes 54 passing therethrough in a thickness direction. The gas passage holes 54 may be formed in the bottom 51.

The cup-shaped filter 50 has the flange 53 fixed to the flange 43 of the diffuser portion 40 such that the bottom 51 faces the second rupturable plate 31.

The gas generator 1 in FIG. 2 operates similarly to the gas generator 1 in FIG. 1. However, even when the first rupturable plate 24 is ruptured to produce broken pieces, the broken pieces are prevented from colliding with the second rupturable plate 31. In addition, after the second rupturable plate 31 is ruptured, the broken pieces of the first rupturable plate are also prevented from entering the diffuser portion 40. Note that, to achieve the same purpose, the cup-shaped filter 50 may be disposed on the side of the first rupturable plate 24.

EXAMPLES

Examples and Comparative Examples

Using the gas generator 1 shown in FIGS. 1, A, B, C, and D in each of examples were adjusted as shown in Table 3.

Note that, since an ignition agent had a composition including ZPP and was powdery, the ignition agent was instantaneously burned. Accordingly, calculation was conducted by (Energy generated from the ignition agent (J/g))×(Charged amount of the ignition agent (g))/1 msec on the assumption that the time required for the combustion of the ignition agent to be completed was 1 msec. In Table 3, TTFG represents a period of time when a current flowed in an igniter until a gas started to be discharged (until a second rupturable plate was ruptured). TTFG represents a numeral value obtained from a tank internal pressure curve when the gas generator was placed in a 28.3 L sealed tank and actuated at a room temperature.

In each of Examples 1 to 5, by adjusting A, B and C so as to satisfy the energy control factor in the equation (I): A/B×C=320 to 490 and the energy control factor in the equation (II): (A+D)/B×C=430 to 580, it is possible to allow the energy (the pressure wave) to efficiently propagate and reliably rupture the second rupturable plate.

FIG. 3 shows the results of Examples and Comparative Examples plotted to the graph having (A+D)/B×C in an abscissa axis and TTFG in an ordinate axis. FIG. 4 shows the results of Examples and Comparative Examples plotted to the graph having AB×C in an abscissa axis and TTFG in an ordinate axis. Minimum values are obtained in the range of (A+D)/B×C=430 to 580 and in the range of AB×C=320 to

TABLE 3

|  | A J/msec | B cm² | C g/cm³ | D J/msec | A/B × C | (A + D)/ B × C | E mol | F mol/sec | A/B × C × (E + F)/E | (A + D)/ B × C × (E + F)/E | TTFG msec |
|---|---|---|---|---|---|---|---|---|---|---|---|
| Comparative Example 1 | 1775 | 2.2 | 0.62 | 527 | 499 | 647 | 0.30 | 0.011 | 518 | 672 | 2.4 |
| Comparative Example 2 | 2788 | 3.5 | 0.62 | 509 | 496 | 587 | 0.51 | 0.018 | 514 | 608 | 2.4 |
| Comparative Example 3 | 3973 | 4.9 | 0.07 | 1112 | 59 | 76 | 1.75 | 0.026 | 60 | 77 | 4.6 |
| Example 1 | 4672 | 4.9 | 0.34 | 1522 | 325 | 431 | 2.9 | 0.030 | 328 | 435 | 2.1 |
| Example 2 | 4672 | 4.9 | 0.35 | 1522 | 333 | 441 | 1.3 | 0.030 | 341 | 451 | 2.2 |
| Example 3 | 3973 | 4.9 | 0.43 | 1053 | 346 | 438 | 1.7 | 0.026 | 351 | 444 | 2.3 |
| Example 4 | 3719 | 4.9 | 0.50 | 1522 | 379 | 535 | 1.8 | 0.024 | 384 | 542 | 2.2 |
| Example 5 | 4479 | 4.9 | 0.43 | 1522 | 390 | 523 | 1.6 | 0.029 | 397 | 533 | 2.2 |

In Examples 1 to 5, the values obtained by the equation (I) were 325, 333, 346, 379, and 390 and were within the range of the equation (I): A/B×C=320 to 490. Also in Examples 1 to 5, the values obtained by the equation (II) were 431, 438, 441, 523, and 535 and were within the range of the equation (II): (A+D)/B×C=430 to 580. Further, TTFG in each of Examples 1 to 5 was within 2.3 msec, so that the discharge of the gas was initiated within a short period of time from the actuation of the igniter.

In Comparative Examples 1 to 3, the values obtained by the equation (I) were 499, 496, and 59 and were out of the range of the equation (I): A/B×C=320 to 490. Also, in Comparative Examples 1 to 3, the values obtained by the equation (II) were 647, 587, and 76 and were out of the range of the equation (II): (A+D)/B×C=430 to 580. Further, in each of Comparative Examples 1 to 3, TTFG shows a generally long time.

Since A (J/msec) in Comparative Example 1 was small, in order to increase the energy control factors obtained by the equations (I) and (II), it was necessary to decrease B and increase C. However, even though the energy factors were increased in this way, the same effect as obtained with the present invention was not sufficiently obtained. The point of the time when the second rupturable plate was ruptured was later, though slightly, than that in each of the gas generators according to the specifications of Examples.

In Comparative Example 2, the energy control factors obtained by the equations (I) and (II) were not different from those in Comparative Example 1. However, since the cross-sectional area B was larger than that in Comparative Example 1 and the energy was more likely to be dispersed than in Comparative Example 1, it was difficult to efficiently rupture the second rupturable plate.

Since A (J/msec) was large in Comparative Example 3, B had to be increased and C had to be decreased, and it was not possible to obtain the energy control factors obtained by the equations (I) and (II) sufficient to rupture the second rupturable plate.

490 respectively, so that ranges which realize a fastest start of the gas discharging are specified.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
   an ignition device chamber arranged at a first end opening of a cylindrical housing;
   a diffuser portion provided with a gas discharge port and arranged at a second end opening opposite to the first end opening in a longitudinal axial direction of the cylindrical housing;
   a pressurized gas chamber arranged between the ignition device chamber and the diffuser portion;
   a first rupturable plate closing the first end opening between the ignition device chamber and the pressurized gas chamber;
   a second rupturable plate closing the second end opening between the pressurized gas chamber and the diffuser portion;
   an igniter and a molded article of a gas generating agent being accommodated in the ignition device chamber;
   a gas which serves as a gas source being charged in the pressurized gas chamber; and
   an amount A (J/msec) of energy generated per unit time from the molded article of the gas generating agent charged in the ignition device chamber,
   a cross-sectional area B (cm²), orthogonal to the longitudinal axial direction of the cylindrical housing, of the pressurized gas chamber at a portion proximate to the ignition device chamber, and
   a density C (g/cm³) of the gas charged in the pressurized gas chamber satisfying an energy control factor represented by the following equation (I):

$$A/B \times C = 320 \text{ to } 490 \qquad (I).$$

2. The gas generator according to claim 1, wherein the first rupturable plate or the second rupturable plate is covered with a cup-shaped filter from the pressurized gas chamber, the cup-shaped filter has a bottom, a circumferential wall and an opening, at least the circumferential wall is provided with a plurality of gas passage holes passing therethrough in a thickness direction, and the opening of the cup-shaped filter is fixed to the diffuser portion such that the bottom thereof faces the first rupturable plate or the second rupturable plate.

3. A gas generator, comprising:

an ignition device chamber arranged at a first end opening of a cylindrical housing;

a diffuser portion provided with a gas discharge port and arranged at a second end opening opposite to the first end opening in a longitudinal axial direction of the cylindrical housing;

a pressurized gas chamber arranged between the ignition device chamber and the diffuser portion;

a first rupturable plate closing the first end opening between the ignition device chamber and the pressurized gas chamber;

a second rupturable plate closing the second end opening between the pressurized gas chamber and the diffuser portion;

an igniter which includes an ignition agent, and a molded article of a gas generating agent being accommodated in the ignition device chamber;

a gas which serves as a gas source being charged in the pressurized gas chamber; and an amount A (J/msec) of energy generated per unit time from the molded article of the gas generating agent charged in the ignition device chamber, an amount D (J/msec) of energy generated per unit time from the igniter, a cross-sectional area B (cm$^2$), orthogonal to the longitudinal axial direction of the cylindrical housing, of the pressurized gas chamber at a portion proximate to the ignition device chamber, and a density C (g/cm$^3$) of the gas charged in the pressurized gas chamber satisfying an energy control factor represented by the following equation (II):

$$(A+D)/B \times C = 430 \text{ to } 580 \qquad (II).$$

4. The gas generator according to claim 3, wherein the first rupturable plate or the second rupturable plate is covered with a cup-shaped filter from the pressurized gas chamber, the cup-shaped filter has a bottom, a circumferential wall and an opening, at least the circumferential wall is provided with a plurality of gas passage holes passing therethrough in a thickness direction, and the opening of the cup-shaped filter is fixed to the diffuser portion such that the bottom thereof faces the first rupturable plate or the second rupturable plate.

* * * * *